Figure 1:
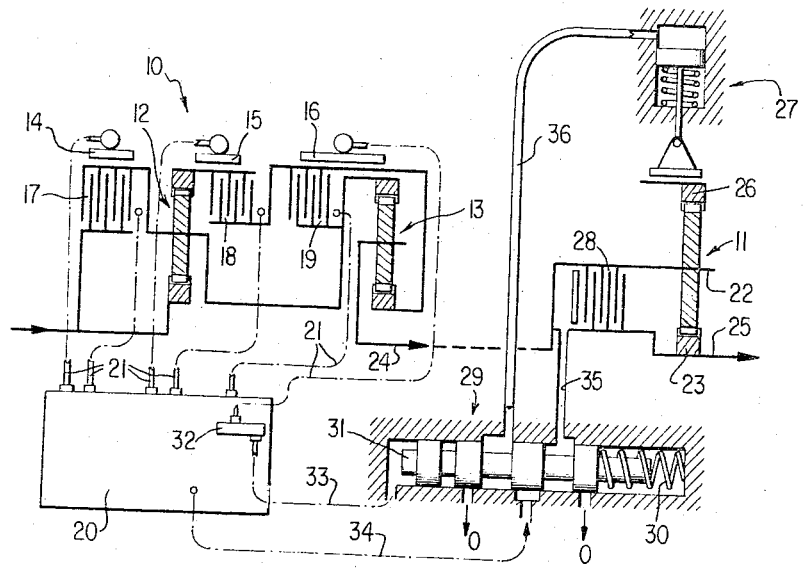

April 11, 1967     F. K. H. NALLINGER     3,313,182

VEHICLE TRANSMISSION

Filed Sept. 18, 1964

INVENTOR.
FRIEDRICH K. H. NALLINGER
BY Dicke & Craig
ATTORNEYS.

United States Patent Office 3,313,182
Patented Apr. 11, 1967

3,313,182
VEHICLE TRANSMISSION
Friedrich K. H. Nallinger, Stuttgart, Germany, assignor to Daimler-Benz Aktiengesellschaft, Stuttgart-Untertürkheim, Germany
Filed Sept. 18, 1964, Ser. No. 397,527
Claims priority, application Germany, Sept. 26, 1963, D 42,568
10 Claims. (Cl. 74—740)

The present invention relates to a transmission arrangement for motor vehicles which includes a multi-speed main change-speed transmission, shifted by an auxiliary force and preferably spatially combined with the driving engine, especially formed into a single block therewith, and a two-speed auxiliary transmission which is also shifted by an auxiliary force.

Transmission arrangements of the aforementioned type are ordinarily designated as overdrive arrangements and are constructed frequently also as genuine overdrives. Often times the desire exists to utilize such arrangements also with automatically shifted main transmissions and to protect thereby the auxiliary transmission against overload by an excessive input torque. It is thereby indifferent in principle whether the auxiliary transmission is combined with the main transmission or—separate from the main transmission—is coordinated to the driven axle. The latter arrangement additionally produces the advantage that a part of the entire conversion of the torque takes place at the axle and the drive shaft connection or line only has to absorb smaller torques. Additionally, auxiliary transmissions with different ratios, that is, several axles, may be selectively installed with the same main transmission.

The present invention fully satisfies the aforementioned wishes in that, with an automatically shifted main transmission, the auxiliary force for the shifting of the auxiliary transmission is taken off from the main transmission as well as the control member controlling this auxiliary force is operatively connected with the actuating or control member shifting the highest speed of the main transmission in such a manner that upon engagement of the highest speed in the main transmission also the auxiliary transmission is shifted to its highest speed or is readied for this shifting operation.

There is achieved by such an arrangement that the auxiliary transmission can be effectively engaged only, when the highest speed in the main transmission is engaged. As soon as a downward shifting operation takes place in the main transmission from the highest speed thereof, the auxiliary transmission is also disengaged or also shifts down, with the auxiliary transmission being so constructed that in the disengaged condition its input and output members are connected with each other so that the gears thereof need not absorb any torque and cannot be overloaded.

The realization of the proposal according to the present invention will also depend in each case on how the main transmission is constructed. Thus, there exists, for example, transmissions which are provided for each speed with at least one separate actuating member, that is, at least one predetermined actuating member is co-ordinated to each speed which becomes effective only in the one speed, but not with any of the other speeds. For that case the present invention proposes that this actuating member for the highest speed of the main transmission is operatively connected with the control member of the auxiliary transmission and this control member is adapted to be acted upon or loaded, on the one hand, by a spring force and, on the other, by the force in the actuating member of the main transmission. According to a further development of the present invention, the actuating force for the engagement of the highest speed in the main transmission may simultaneously form the auxiliary force for the auxiliary transmission, whereby the latter is adapted to be shifted into one speed by a spring force and into the other speed thereof by the auxiliary force.

The present invention is preferably considered for application with a hydraulic auxiliary force though other auxiliary forces are, of course, not excluded but are equally applicable. If in the described case the actuating member for the highest speed in the main transmission is, for example, a hydraulically actuated lamellae friction clutch, then the actuating cylinder thereof or the supply line leading thereto is connected by way of a branch line with a control member or directly with the actuating member of the auxiliary transmission, whereby the latter may, for example, also be a lamellae friction clutch. This arrangement is extremely simple and at the same time produces an auxiliary transmission shifting up and down in unison with the highest speed of the main transmission which is particularly purposeful when the auxiliary transmission is coordinated to the driven axle.

With other main transmissions in which the actuating members become effective not only in a singly but in several speeds, the present invention proposes that the control member for the engagement of the highest speed in the main transmission is connected with the control member of the auxiliary speed and this latter control member is adapted to be acted upon or loaded, on the one hand, by spring force and, on the other, by the control force.

It is desirable in many cases to control the auxiliary transmission additionally by other influencing magnitudes. For that purpose the present invention proposes that a blocking or closure member is arranged in the connection conducting the control force or auxiliary force to the control member or actuating member of the auxiliary transmission which blocking member is adapted to be moved either manually or automatically upon exceeding a predetermined vehicle velocity from a position blocking or closing this connection into a position opening the same.

The construction of the auxiliary transmission may appropriately be made in such a manner that its gear wheels have to absorb moments only in its higher speed— which is thus engaged only in the highest speed of the main transmission. The auxiliary transmission may be provided with two actuating members, for example, with a brake and with a clutch to which the control member selectively supplies the auxiliary force. However, one of the actuating members may be engaged, for example, the brake by a spring force and be disengaged by the auxiliary force whereas the reverse will take place with the other actuating member. In that case the auxiliary force is supplied simultaneously to both actuating members or they are both simultaneously relieved therefrom. This type of construction is particularly well suited if the actuating member for the highest speed can be directly tapped in the main transmission. One only needs in that case a branch line to the auxiliary transmission with the possibly desired blocking or closure member therein.

Accordingly, it is an object of the present invention to provide an auxiliary transmission for use with an automatically shifted main transmission which is simple in construction, extremely reliable in operation yet avoids the drawbacks encountered with the prior art constructions.

Another object of the present invention resides in the provision of a change speed transmission system for motor vehicles consisting of main and auxiliary transmission in which the auxiliary transmission, particularly an overdrive transmission is at all times protected against overloads.

A further object of the present invention resides in the provision of an automatically shifted main transmission for motor vehicles which includes an auxiliary overdrive transmission whose control and/or actuating mechanism effecting selective engagement and disengagement is operatively connected with the automatic shifting mechanism of the highest speed of the main transmission.

Still another object of the present invention resides in the provision of a combined change speed gear consisting of automatic main transmission and of auxiliary overdrive transmission in which the over drive can be engaged only when the highest speed is automatically engaged in the main transmission and which permits the use of different transmission ratios in the auxiliary transmission for use with the same main transmission.

Still a further object of the present invention resides in the provision of an auxiliary transmission for motor vehicles so connected and operatively associated with the automatically shifted main transmission of the vehicle that the auxiliary force of the main transmission is effectively utilized also in the auxiliary transmission.

Figure 2:
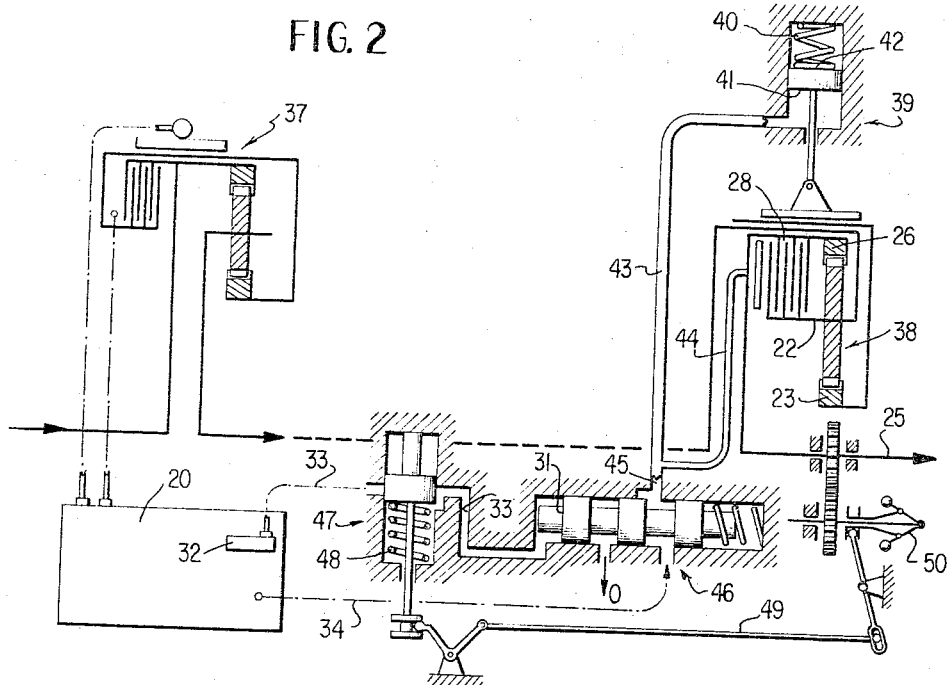

These and other objects, features and advantages of the present invention will become more obvious from the following description when taken in connection with the accompanying drawing which shows, for purposes of illustration only, two embodiments in accordance with the present invention, and wherein FIGURE 1 is a schematic view of one transmission arrangement in accordance with the present invention, and FIGURE 2 is a schematic view of a modified embodiment of a transmission arrangement in accordance with the present invention.

Referring now to the drawing wherein like reference numerals are used throughout the two views to designate like parts, the transmission arrangement illustrated in FIGURE 1 is constituted by a main transmission generally designated by reference numeral 10 and by an auxiliary transmission generally designated by reference numeral 11. The former is combined into a unitary block in a conventional manner with the driving engine (not shown) and the latter may be co-ordinated to the driven axle (not shown) in any conventional manner. The main transmission 10 consists of two planetary gear sets generally designated by reference numerals 12 and 13, which are adapted to be selectively shifted to four forward speeds and a reverse speed by three brakes 14, 15, and 16 as well as by three clutches 17, 18, and 19. The transmission construction and the shifting operation corresponds, for example, to that of the transmission disclosed in German Patent 1,065,730. A shifting plate 20 is provided for the automatic shifting of the main transmission 10 which contains the control slide valves and control elements (not shown). Lines 21 lead from this shifting plate 20 to the aforementioned actuating members 14, 15, 16, 17, 18, and 19.

The auxiliary transmission 11 is also constructed as planetary gear transmission. The planet carrier 22 serves as input member and the sun gear 23 as output member. The former is connected with the output shaft 24 of the main transmission 10 whereas the latter is connected with the output shaft 25 of the overall transmission system. The ring gear 26 serves as reaction member which is adapted to be held stationary by means of a brake generally designated by reference numeral 27. The lamellae friction clutch 28 is arranged between the planet carrier 22 and the sun gear 23 which clutch 28 is engaged in the lower speed and connects with each other the input and output elements 22 and 25. In the upper speed and the brake 27 is engaged instead of the clutch 28 and the output shaft 25 is driven with increased rotational speed.

The brake 27 and the clutch 28 are selectively actuated by a hydraulic auxiliary force. The hydraulic force is controlled by a control slide valve member generally designated by reference numeral 29 provided with several spools which is adapted to be acted upon, on the one hand, by a spring 30 and, on the other, by a control force. The control force for the slide valve 29 is taken off from the conventional control member 32 arranged in the shifting plate 20 and not illustrated herein in detail for the highest speed of the main transmission 10 and is supplied through a connecting line 33 to the end face 31 of the control member 29. The auxiliary force itself is also taken off from the main transmission 10 and is supplied by way of a connecting line 34 to the control valve member 29. The latter is illustrated in FIGURE 1 in a center position, in which it closes the line 34.

Under the influence of the spring 30 the slide valve control member 29 will normally be in its left end position and will connect the line 34 with the line 35 leading to the clutch 28. The clutch 28 is thereby engaged by the auxiliary force and the auxiliary transmission 11 is in its lower speed. This condition is maintained for such length of time until the main transmission 10 is shifted into its highest speed by a corresponding movement of the control member 32 in the shifting plate 20. The end face 31 of the control slide valve member 29 is then simultaneously actuated by the control force and the control slide valve member 29 is thereby pressed into the right end position against the force of spring 30. The clutch 28 is now completely relieved by its connection with the discharge indicated by numeral zero, and the auxiliary force line 34 is connected with the line 36 leading to the brake 27 so that the latter engages. The auxiliary transmission 11 now finds itself in its higher speed.

During down-shifting of the main transmission 10 from the highest speed, the shifting operation takes place in reverse sequence in the auxiliary transmission 11. By the disappearance of the control pressure on the end face 31 thereof, the control slide valve member 29 is again pressed back in the already described left end position. The brake 27 is disengaged and the clutch 28 is engaged.

In FIGURE 2 the main transmission generally designated by reference numeral 37 is only illustrated with respect to its end stage. The sun gear 23 serves in this case in the auxiliary transmission generally designated by reference numeral 38 as reaction member and can be held fast by the brake generally designated by reference numeral 39. The planet carrier 22 again serves as input element whereas the ring gear 26 is connected with the output shaft 25. The clutch 28 is constructed according to FIGURE 1, however, it connects this time the planet carrier 22 with the ring gear 26. The brake generally designated by reference numeral 39 is engaged by the spring 40 and can be disengaged by a pressure on the back side 41 of the piston 42. Lines 43 and 44 to the brake 39 and clutch 28, respectively, are connected with the control slide valve member generally designated by reference numeral 46 by way of a common connection 45.

The control slide valve member 46 is acted upon, in the manner already described, on one side by the spring 30 whereas a control force is adapted to act on the other end face 31 which control force is supplied through the line 33 from the control member 32 for the highest speed of the main transmission 37. The line 34 again conducts the auxiliary force from the shifting plate 29 of the main transmission 37 to thereby the control slide valve member 46. In contrast to the arrangement according to FIGURE 1, this line 34 is either connected by the control slide valve member 46 with the common connection 45 leading to the two actuating members 39 and 28 or this connection 45 is completely relieved by its connection with the discharge 0.

In the illustrated position of the control slide valve member 46, both the clutch 28 as well as the brake 39 are under pressure, that is, the former is engaged and the latter is disengaged. The auxiliary transmission is thus in the lower speed. If the control slide valve member 46 is shifted by the control force, that is, by the pressure on the end face 31 into its right end position, then both actuating members 39 and 28 are relieved, that is, the clutch 28 is disengaged and the brake 39 is engaged. The auxiliary transmission 38 now is in the higher speed. The effect of this shifting operation is the same as already described with the FIGURE 1.

A closure slide valve generally designated by reference 47 is disposed in the line 33 which is held by the spring 48 in the closing position thereof closing or blocking the line 33. The closure valve 47 is operatively connected by way of a linkage 49 with a centrifugal governor 50 which is driven from the output or driven shaft 25. If the vehicle velocity exceeds a predetermined limit value, then the closure valve 47 is displaced downwardly by the centrifugal governor 50 against the spring 48 and the line 33 is opened. Only then the control force can act on the control slide valve member 46. Thus, when the main transmission 37 is already in the highest speed, the auxiliary transmission 38 is shifted to the higher speed only upon exceeding a predetermined driving speed. During normal downward shifting, the operation takes place in reverse sequence. In case of the so called kickdown operation, for example, for purposes of better acceleration, the line 33 becomes pressureless so that the control slide valve member 46 shifts the auxiliary transmission 38 also when the closure valve 47 is still in the open position thereof.

While I have shown and described two embodiments in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are encompassed by the scope of the appended claims.

I claim:

1. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means controlled by said first control means for automatically controlling the shifting of said auxiliary transmission in such a manner that the auxiliary transmission is at least readied for shifting to the higher speed thereof by the auxiliary force means of the main transmission upon engagement in the main transmission of the highest speed thereof, second actuating means operable by said auxiliary force means for effectively engaging and disengaging the two speeds of said auxiliary transmission, said means for automatically controlling the shifting of said auxiliary transmission further including second control means operable to control the auxiliary force means to said second actuating means, and connecting means operatively connecting said second control means with one of said first control and actuating means to actuate the auxiliary transmission by the auxiliary force means of the main transmission.

2. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission and first control means operable to automatically control the auxiliary force means to said first actuating means, and means controlled by said first control means for automatically controlling the shifting of said auxiliary transmission in such a manner that the auxiliary transmission is at least readied for shifting to the higher speed thereof by the auxiliary force means of the main transmission upon engagement in the main transmission of the highest speed thereof, second actuating means operable by said auxiliary force means for effectively engaging and disengaging the two speeds of said auxiliary transmission, said means for automatically controlling the shifting of said auxiliary transmissions further including second control means operable to control the auxiliary force means to said second actuating means, and connecting means operatively connecting said second control means with one of said first control and actuating means to actuate the auxiliary transmission by the auxiliary force means of the main transmission, said main transmission including at least one separate actuating member for each speed constituted by said first actuating means, the actuating member of the highest speed of the main transmission being operatively connected with the second control means of the auxiliary transmission, and spring means in said auxiliary transmission, said second control means being acted upon, on the one hand, by said spring means, and on the other, by the auxiliary force means of the actuating member for the highest speed.

3. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means controlled by said first control means for automatically controlling the shifting of said auxiliary transmission in such a manner that the auxiliary transmission is at least readied for shifting to the higher speed thereof by the auxiliary force means of the main transmission upon engagement in the main transmission of the highest speed thereof, the actuating force constituted by said auxiliary force means for the engagement of the highest speed in the main transmission simultaneously forming the auxiliary force means for the auxiliary transmission, and spring means for shifting said auxiliary transmission to one speed, the latter being shifted to the other speed thereof by said auxiliary force means.

4. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means for automatically shifting said auxiliary transmission in such a manner that the auxiliary transmission is at least readied for shifting to the higher speed thereof by the auxiliary force means of the main transmission upon engagement in the main transmission of the highest speed thereof including second actuating means operable by said auxiliary force means for effectively engaging and disengaging the two speeds of said auxiliary transmission, second control means operable to control the auxiliary force means to said second actuating means, and connecting means operatively connecting said second control means with one of said first control and actuating means to actuate the auxiliary transmission by the auxiliary force means of the main transmission, said main transmission including at least one separate actuating member for each speed constituted by said first actuating means, the actuating member of the highest speed of the main transmission being operatively connected with the second control means of the auxiliary transmission, and spring means in said auxiliary transmission, said second control means being acted upon, on the one hand, by said spring means, and on the other, by the auxiliary force means of the actuating member for the highest speed, the actuating force constituted by said auxiliary force means for the engagement of the highest speed in the main transmission simultaneously forming the auxiliary force means for the auxiliary transmission, and spring means for shifting said auxiliary transmission to one speed, the latter being shifted to the other speed thereof by said auxiliary force means.

5. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means for automatically shifting said auxiliary transmission in such a manner that the auxiliary transmission is at least readied for shifting to the higher speed thereof by the auxiliary force means of the main transmission upon engagement in the main transmission of the highest speed thereof, the actuating members of the first actuating means for the main transmission being each operable to shift several speeds, the control member of said first control means for the engagement of the highest speed in the main transmission being operatively connected with the second control means in the auxiliary transmission, and spring force means in said auxiliary transmission, said second control means being acted upon, on the one hand, by said spring force means and, on the other, by the auxiliary force means.

6. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means for automatically shifting said auxiliary transmission in such a manner that the auxiliary transmission is at least readied for shifting to the higher speed thereof by the auxiliary force means of the main transmission upon engagement in the main transmission of the highest speed thereof including second actuating means operable by said auxiliary force means for engaging and disengaging the two speeds of said auxiliary transmission, second control means operable to control the auxiliary force means to said second actuating means, and connecting said second control means with at least one of said first control and actuating means for the main transmission, the actuating members of the first actuating means for the main transmission being each operable to shift several speeds, the control member of said first control means for the engagement of the highest speed in the main transmission being operatively connected with the second control means in the auxiliary transmission, and spring force means in said auxiliary transmission, said second control means being acted upon, on the one hand, by said spring force means, and on the other, by the auxiliary force means, and closure means arranged in the connection of said connecting means conducting the auxiliary force means from the main transmission to one of said second control and actuating means, and means for displacing said closure means from the closing position into the open position thereof.

7. A transmission arrangement according to claim 6, wherein said displacing means is a manually operable control.

8. A transmission arrangement according to claim 6, wherein said displacing means includes speed-responsive means for automatically displacing said closure means into the open position thereof upon exceeding a predetermined vehicle speed.

9. A transmission arrangement for motor vehicles having an engine and a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means for automatically shifting said auxiliary transmission in such a manner that the auxiliary transmission is at least readied for shifting to the higher speed thereof by the auxiliary force means of the main transmission upon engagement in the main transmission of the highest speed thereof including second actuating means operable by said auxiliary force means for effectively engaging and disengaging the two speeds of said auxiliary transmission, second control means operable to control the auxiliary force means to said second actuating means, and connecting means operatively connecting said second control means with one of said first control and actuating means to actuate the auxiliary transmission by the auxiliary force means of the main transmission, said auxiliary transmission being separate from the main transmission and being coordinated to the driven axle while said main transmission is combined into a unitary block with the engine.

10. A transmission arrangement for motor vehicles having a multi-speed main change-speed transmission and a two-speed auxiliary transmission, comprising:

means for automatically shifting said main transmission by an auxiliary force means including first actuating means operable by said auxiliary force means for engaging and disengaging the highest speed of the main transmission, and first control means operable to automatically control the auxiliary force means to said first actuating means, and means for automatically shifting said auxiliary transmission in such a manner that the auxiliary transmission is at least readied for shifting to the higher speed thereof by the auxiliary force means of the main transmission upon engagement in the main transmission of the highest speed thereof, and speed-responsive means preventing the shifting of said auxiliary transmission to the higher speed thereof until the vehicle speed exceeds a predetermined velocity.

References Cited by the Examiner

UNITED STATES PATENTS

| | | | |
|---|---|---|---|
| 2,127,354 | 8/1938 | Fishburn et al. | 74—328 |
| 2,214,986 | 9/1940 | Barnes | 74—781 |
| 2,932,988 | 4/1960 | Flynn et al. | 74—745 |

MARK NEWMAN, *Primary Examiner.*

DAVID J. WILLIAMOWSKY, *Examiner.*

J. R. BENEFIEL, *Assistant Examiner.*